(12) United States Patent
Lang et al.

(10) Patent No.: US 12,385,556 B2
(45) Date of Patent: Aug. 12, 2025

(54) TRANSMISSION ARRANGEMENT AND AGRICULTURAL TOWING VEHICLE

(71) Applicant: DEERE & COMPANY, Moline, IL (US)

(72) Inventors: Matthias Lang, Mannheim (DE); Rainer Gugel, Plankstadt (DE); David Mueller, Dettenheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/647,071

(22) Filed: Apr. 26, 2024

(65) Prior Publication Data

US 2024/0376970 A1 Nov. 14, 2024

(30) Foreign Application Priority Data

May 11, 2023 (DE) .......................... 102023112521.4

(51) Int. Cl.
*F16H 37/08* (2006.01)

(52) U.S. Cl.
CPC ... *F16H 37/084* (2013.01); *F16H 2037/0886* (2013.01)

(58) Field of Classification Search
CPC .......... F16H 37/084; F16H 2037/0866; F16H 2037/0886; H02K 49/102; H02K 7/11
See application file for complete search history.

(56) References Cited

U.S. PATENT DOCUMENTS

| | | | |
|---|---|---|---|
| 10,385,946 B2 | 8/2019 | Lang et al. | |
| 10,913,344 B2* | 2/2021 | Samie | B60K 6/387 |
| 11,670,995 B2 | 6/2023 | Lang et al. | |
| 11,691,497 B2 | 7/2023 | Lang et al. | |
| 2016/0359441 A1* | 12/2016 | Calverley | H02K 49/102 |

FOREIGN PATENT DOCUMENTS

| | | |
|---|---|---|
| CN | 104648115 A | 5/2015 |
| CN | 105291812 A | 2/2016 |
| CN | 105667295 A | 6/2016 |

(Continued)

OTHER PUBLICATIONS

Extended European Search Report and Written Opinion issued in European Patent Application No. 24172596.9 dated Oct. 22, 2024, in 17 pages.

*Primary Examiner* — Huan Le (57) ABSTRACT

A transmission arrangement for a drivetrain of an agricultural towing vehicle includes an input shaft, an output shaft, a transmission device, a transmission unit, and an electric machine. The transmission device includes a mechanical transmission branch and a variable transmission branch with a magnetic-electrical epicyclic transmission stage having an internal rotor, an external stator, and an interposed rotatable magnetic modulation ring being rotationally conjointly connectable to a clutch drive shaft. The transmission unit is arranged downstream in the power flow and includes a first clutch and a second clutch connected to the clutch drive shaft and at least four gear sets for establishing at least four gear ratio stages. The electric machine is coupled to the input shaft and configured to transmit electrical power to the external stator, which is configured to rotate the modulation ring.

16 Claims, 5 Drawing Sheets

(56) References Cited

FOREIGN PATENT DOCUMENTS

| | | |
|---|---:|---|
| CN | 110497786 A | 11/2019 |
| DE | 102013110709 A1 | 4/2015 |
| DE | 102015114559 A1 | 3/2016 |
| DE | 102017206413 A1 | 12/2017 |
| DE | 102016220701 A1 | 4/2018 |
| DE | 102017219758 A1 | 5/2019 |
| DE | 102020119984 A1 | 2/2022 |
| EP | 3255761 A1 | 12/2017 |
| EP | 3859967 A1 | 8/2021 |
| EP | 3945665 A1 | 2/2022 |
| WO | WO 2009050078 A2 | 4/2009 |

* cited by examiner

TRANSMISSION ARRANGEMENT AND AGRICULTURAL TOWING VEHICLE

CROSS-REFERENCE TO RELATED APPLICATIONS

This application claims priority to German Patent Application No. 102023112521.4, filed May 11, 2023, which is hereby incorporated by reference.

FIELD OF THE DISCLOSURE

The disclosure relates to a transmission arrangement and to an agricultural towing vehicle.

BACKGROUND

For a long time, in agricultural towing vehicles use has been made of transmission arrangements in order to be able to change the propulsion of the towing vehicle, even under high tensile load, for example caused by a work implement hitched thereto, such as a soil cultivation tool (for example a plow) or the like, by it simply being possible to change the traction motor rotational speed without interruption. In this respect, the transmission arrangement may be in particular a powershift transmission arrangement. A known measure is to increase the number of gear ratio stages of a transmission arrangement by said arrangement comprising a combination of transmissions, for example by combining a transmission device with a transmission unit. DE 10 2013 110 709 A1 discloses such a transmission arrangement. The transmission units used in that document may in turn be known from WO 2009/050078 A2 as dual-clutch transmissions.

SUMMARY

Alternatively, the transmission arrangement can be equipped with a continuously variable transmission. Continuously variable transmissions are implemented in power-split form with a variable hydraulic path. Here, at an input side, a proportion of the drive power is converted into hydraulic power. The proportion of the hydraulic power can be varied by means of variators. At an output side, the hydraulic energy is converted back into mechanical energy. The structural design of these continuously adjustable transmissions is associated in part with a high complexity, inertia, and the development of disruptive noise.

Proceeding from this, it is therefore an object of the present disclosure to propose a transmission arrangement and an agricultural towing vehicle which largely avoid the disadvantages known and are of a structurally simpler and more efficient design.

This object is achieved by means of a transmission arrangement having the features of one or more of the embodiments disclosed herein and an agricultural towing vehicle having the features of one or more embodiments disclosed herein. Some embodiments may relate to particularly advantageous embodiments of the disclosure.

According to one or more embodiments, a transmission arrangement for a drivetrain of an agricultural towing vehicle, for example a tractor, is proposed. The transmission arrangement comprises an input shaft, an output shaft, a transmission device, and a transmission unit positioned downstream in the power flow. The transmission unit comprises a first clutch, a second clutch and at least four gear sets for establishing gear ratio stages. The transmission device contains a mechanical transmission branch and a variable transmission branch with a magnetic-electrical epicyclic transmission stage. The epicyclic transmission stage comprises an internal rotor, an external stator, and an interposed magnetic modulation ring. The modulation ring is either rotationally conjointly connected or able to be connected in terms of drive to a clutch drive shaft of the clutches. An electric machine coupled to the input shaft generates electrical power which is able to be partially or completely transmitted to the stator of the epicyclic transmission stage. Here, the stator of the epicyclic transmission stage is able to be actuated to achieve a rotation of the modulation ring.

The transmission arrangement according to the disclosure combines an electrically power-split continuously variable transmission with a transmission unit which is positioned downstream in the power flow and which is in particular in the form of a dual-clutch transmission in a more efficient and more cost-optimized manner. Due to the modulation ring which is rotationally conjointly connected or able to be connected in terms of drive to a clutch drive shaft of the clutches, a single variator output shaft is advantageously implemented in the continuously variable transmission, reducing the complexity of the transmission arrangement.

The rotatable modulation ring offers the possibility of generating different rotational speeds for transmission to the downstream transmission unit, without any notable physical moments of inertia occurring in the process. In this way, the gearshift operations can advantageously be considerably shortened and the controllability of the transmission arrangement is significantly improved. When shifting gear, the two (in particular powershiftable) clutches of the transmission unit can be used in order to bring a corresponding transmission input shaft of the transmission unit to the new rotational speed. In parallel therewith, the modulation ring is adjusted to the desired new rotational speed.

The rotational speed-related adjustment of the modulation ring is effected by way of its rotatable position between the internal rotor and the external stator. In order to adjust the modulation ring to different rotational speeds in a technically simple manner, a variable electrical power is transmitted to the external stator. Here, the external stator can be equipped with at least one stator winding, the excitation frequency of which is able to be changed or switched. The stator is thus able to be actuated with different excitation frequencies.

The electrical power is generated by the electric machine which is coupled to the input shaft and which contributes to the implementation of the electrical variable transmission branch. For a stable generation of electrical power, the electric machine can be in a constant rotational speed ratio with the input shaft. This is achieved, for example, by a coupling with multiple toothed wheels between the input shaft and the electric machine. Alternatively, a rotor of the electric machine may be rotationally conjointly connected to the input shaft and generate an electrical power while the input shaft is being driven—in particular by an internal combustion engine.

An efficient response behavior of the modulation ring can be effected via the modulation of an electromagnetic field between the internal rotor and the external stator. To this end, the modulation ring is of magnetic design, in particular with ferromagnetic segments. The rotor is in particular of magnetic design and advantageously has a number of magnetic poles or pole pairs. The stator has one or more electric poles or pole pairs for receiving the transmitted electrical power.

In addition, the stator of the epicyclic transmission stage can be actuated in such a way that the modulation ring is rotatable in different directions of rotation in a controlled manner and the direction of rotation of the output shaft can consequently be set differently. In particular, the direction of rotation of the output shaft can be set in the opposite direction to the direction of rotation of the input shaft. An otherwise customary additional reverse gear in the transmission arrangement, in particular in the transmission unit, can be omitted as a result. The transmission arrangement can then be produced in a more compact and more inexpensive manner with a reduced number of components and requires a smaller installation space and lower maintenance effort.

In an embodiment, a transmission control unit is provided for the transmission of the electrical power to the stator and for the actuation thereof. The transmission control unit may be assigned to the transmission arrangement, or the transmission arrangement may comprise the transmission control unit. The transmission control unit may be in the form of an electronic module with a power electronics system. The control unit may comprise a computing unit, a computer, a processor, a memory and/or all the software, hardware, algorithms, connections, in particular also sensors, that are required for the actuation of the stator of the magnetic-electrical epicyclic transmission stage and thus also for the open-loop and/or closed-loop control of the modulation ring. The transmission control unit may comprise any apparatus that can analyze data from various sensors, compare data, and make the decisions necessary to control, in open-loop and/or closed-loop fashion, and/or perform the operation of the transmission arrangement.

The transmission control unit ensures that the electrical energy or power generated by the electric machine is delivered to the stator, in particular the stator windings thereof, in the required manner. Here, the transmission control unit may be coupled to a power electronics system and/or to an energy store. The power electronics system and/or the energy store may be integrated into the transmission control unit or be actuatable as external unit(s) by the transmission control unit. Alternatively, a battery unit for storing the electrical energy generated by the electric machine may also be provided, this battery unit being able to be actuated by suitable control electronics so as to store electrical power and/or deliver it to the stator.

Furthermore, the transmission control unit may be connected, for example in signal-connected and/or signal-transmitting and/or data-transmitting fashion, to further functional units or components of the transmission arrangement or of the towing vehicle. The control unit can be used for the open-loop and/or closed-loop control and/or actuation of the interconnected functional units or components. A connection in signal-connected and/or signal-transmitting and/or data-transmitting fashion should be understood here as meaning that signals are exchanged between the connected components. The connection can be implemented so as to be wired, i.e. in particular with cables, and/or wirelessly, i.e. by radio, for example using Bluetooth. The transmission control unit can be connected to a communication bus. The communication bus may for example be Isobus, CAN bus, or similar. Moreover, it is possible for a further control unit to be able to be controlled in open-loop and/or closed-loop fashion by the transmission control unit.

The transmission control unit may be assigned to the towing vehicle, in particular be arranged on the towing vehicle. The transmission control unit may alternatively be assigned to the transmission arrangement, or the transmission arrangement may comprise the transmission control unit. The transmission control unit may also be designed in two parts for example as part of the towing vehicle and as part of the transmission arrangement. The transmission control unit may be connected directly to the input and output unit which is arranged in a cab of the towing vehicle and by means of which data entered by an operator can be transmitted to the transmission control unit or be received from said transmission control unit and output. However, it is also conceivable for the transmission control unit to be connected indirectly to the input and output unit by a superordinate control unit.

Signals and data are processed in the transmission control unit. The processed signals and data are at least partially used for the required actuation of the stator or of the stator windings. In particular, the stator windings are effective as one or more exciter coil(s).

The transmission unit can have a reverse gear. In this way, the transmission arrangement contains an additional reverse gear, in particular in the event that the possibility of backward operation by a corresponding actuation of the stator and different directions of rotation of the modulation ring were to not be provided or were to not be sufficient. Integration of the reverse gear into the transmission unit facilitates the compatibility thereof with the power-split transmission device.

In an embodiment, a transmission stage for reversing a direction of rotation is provided outside of the transmission unit. This alternative to a reverse gear in the transmission unit advantageously reduces the complexity of the transmission unit. For example, in the power flow, the transmission stage for reversing a direction of rotation is arranged either between the electric machine and the magnetic-electrical epicyclic transmission stage or between the magnetic-electrical epicyclic transmission stage and the transmission unit. The transmission stage for reversing a direction of rotation makes it possible to provide forward and backward operation, without it being necessary to implement different directions of rotation of the modulation ring.

In an advantageous development of the disclosure, the transmission stage for reversing a direction of rotation comprises a planetary transmission. The functionality of the reversal of the direction of rotation can thus be provided in a compact construction and be of particularly quiet design. For example, the reversal of the direction of rotation at the output of the planetary transmission, that is to say in particular the sun wheel, is assisted by a corresponding actuation of one or more brake apparatus(es) acting on the planetary transmission.

In an embodiment of the disclosure, the transmission stage for reversing a direction of rotation comprises a clutch device positioned upstream of the planetary transmission. Said clutch device enables a reliable transmission of force and torque along the power flow in the region of the transmission stage for reversing a direction of rotation. Here, the clutch device can comprise, on the output side, a shaft to which a sun wheel of the planetary transmission or planetary gear set is rotationally conjointly connected.

The clutch device may be in the form of a powershiftable clutch, for example in the form of a multi-plate clutch (or in the form of a dry single-disk clutch), such as in the form of a friction clutch. The clutch device may alternatively be in the form of a non-powershiftable clutch.

In an advantageous development of the transmission arrangement, a start-up module for electric start-up is arranged between the electric machine and the magnetic-electrical epicyclic transmission stage in the power flow. This start-up module is configured for the selective coupling and decoupling of a drive connection between the input shaft and/or the electric machine and the magnetic-electrical epicyclic transmission stage (in particular the rotor thereof). This makes it possible for the primary drive (for example via an internal combustion engine and the input shaft) to be completely decoupled from the output of the towing vehicle. This enables a purely electric start-up by way of the magnetic-electrical epicyclic transmission stage, such that a high torque can be transmitted to the output. This is advantageous in particular in cases in which the towing vehicle must apply great towing forces upon start-up, that is to say at low driving speed.

In the case of the aforementioned decoupling of the drive connection, the drive (for example internal combustion engine) of the input shaft may be at a standstill. Alternatively, the drive (for example internal combustion engine) of the input shaft may be in operation, such that for example current can continue to be generated by way of the electric machine coupled to the input shaft.

In an embodiment of the disclosure, the start-up module comprises a clutch unit which is drive-connected to the input shaft and/or to the electric machine on the drive side and is rotationally conjointly connected to the rotor of the magnetic-electrical epicyclic transmission stage by way of a rotor drive shaft on the output side. This enables a technically stable coupling and decoupling of the drive connection between the input shaft and/or the electric machine and the magnetic-electrical epicyclic transmission stage (in particular the rotor thereof).

The drive-side drive connection of the aforementioned clutch unit to the input shaft can be of rotationally conjoint design. The drive-side drive connection of the aforementioned clutch unit to the electric machine is, for example, of positively locking design (for example toothed wheel connection).

As an alternative or in addition to the aforementioned clutch unit, the start-up module can comprise a clutch unit which along the power flow is rotationally conjointly connected on one side (for example on the drive side) to the rotor of the magnetic-electrical epicyclic transmission stage by way of a rotor drive shaft and is rotationally conjointly connected on the other side (for example on the output side) to the modulation ring. A combination of the two aforementioned clutch units in the power flow provides technically simple assistance for electric start-up by way of the magnetic-electrical epicyclic transmission stage.

The aforementioned clutch units may each be in the form of a powershiftable clutch, for example in the form of a multi-plate clutch (or in the form of a dry single-disk clutch), such as in the form of a friction clutch. The clutch units may alternatively be in the form of non-powershiftable clutches.

In another embodiment, that clutch unit of the start-up module which is drive-connected to the input shaft and/or to the electric machine on the drive side is effective as the clutch device of the transmission stage for reversing a direction of rotation. Here, the transmission stage for reversing a direction of rotation is arranged between the electric machine and the magnetic-electrical epicyclic transmission stage in the power flow. This integration of the transmission stage for reversing a direction of rotation enables a component-saving and cost-saving implementation of the start-up module. It is for instance possible to save on a start-up module clutch unit that would otherwise be used. The clutch device of the transmission stage for reversing a direction of rotation then also assists, in an additional function, the role of the start-up module.

In a structurally advantageous embodiment, the transmission unit is designed in such a way that the first clutch thereof is rotationally conjointly connected to a first transmission input shaft and the second clutch is rotationally conjointly connected to a second transmission input shaft. Fixed wheels, for example toothed wheels, are rotationally conjointly arranged on the first and second transmission input shaft. Shift wheels, for example toothed wheels or gear-ratio toothed wheels, are rotatably mounted on the output shaft. The fixed wheels can in particular at least partially be in engagement with the shift wheels. Of the at least four gear sets for establishing gear ratio stages, in particular group gear ratio stages, a first gear set and a second gear set each have the fixed wheel on the first input shaft and each have the shift wheel on the output shaft. A third gear set and a fourth gear set each have the fixed wheel on the second transmission input shaft and each have the shift wheel on the output shaft.

The first and/or the second clutch may be in the form of powershiftable clutches, for example in the form of multi-plate clutches (or in the form of dry single-disk clutches), such as in the form of friction clutches. The first and/or the second clutch may alternatively be in the form of non-powershiftable clutches. The first and/or the second clutch and the first and/or second transmission input shafts may be arranged axially parallel to and/or coaxially with one another.

On the output side, the output shaft may be assigned to the transmission unit. The transmission unit may comprise a clutch drive shaft on the input side, that is to say as input side, for example as common input side. However, the input side may also comprise a first and a second clutch drive shaft. The clutch drive shaft may be in the form of a hollow shaft. The first clutch is movable and/or shiftable between an open state, in which the clutch drive shaft is released in terms of drive from the first transmission input shaft, and a closed state, in which the clutch drive shaft is in drive connection with the first transmission input shaft. The second clutch may also be movable and/or shiftable between an open state, in which the clutch drive shaft is released in terms of drive from the second transmission input shaft, and a closed state, in which the clutch drive shaft is in drive connection with the second transmission input shaft. The first and/or the second transmission input shaft may be placed in drive connection with the output shaft. The first and/or the second transmission input shaft may be in the form of hollow shafts. Moreover, the first and/or second transmission input shaft may be arranged coaxially with one another and/or one in the other, in particular one in the other so as to be able to freely rotate. The transmission unit may comprise one or more air pressure seals which can be integrated into the output shaft and/or the first and/or second transmission input shaft.

Specifically, the transmission unit may comprise exactly two transmission input shafts, i.e. the first and the second transmission input shaft, exactly one output shaft and exactly two clutches. Moreover, the transmission unit may comprise exactly four gear sets. The first gear set may comprise a first fixed wheel of the first transmission input shaft, said first fixed wheel meshing with a first shift wheel of the output shaft. The second gear set may comprise a second fixed wheel of the first transmission input shaft, said second fixed wheel being able to be in engagement with a second shift wheel of the output shaft. The third gear set may comprise a third fixed wheel of the second transmission input shaft, said third fixed wheel being able to mesh with a third shift wheel of the output shaft. The fourth gear set may comprise a fourth fixed wheel of the second transmission input shaft, said fourth fixed wheel being able to be in engagement with the shift wheel, in particular a fourth shift wheel, of the output shaft.

In another embodiment of the disclosure, the transmission unit comprises a shift element for coupling two shift wheels, in particular the shift element being able to be rotatably mounted on the output shaft or being able to be non-rotationally conjointly connected to the output shaft. In this case, the shift wheel of the second gear set and the shift wheel of the third gear set are able to be coupled, for example selectively coupled, to the shift element in such a way that at least one winding path gear ratio stage is able to be formed via the second and the third gear set. In this respect, the shift wheel of the second gear set and the shift wheel of the third gear set may be couplable in particular in combination with the first or the fourth gear set, that is to say in particular when the first or the fourth gear set is also fixed to the output shaft by a coupling element. In other words, the shift wheel of the second gear set, the shift wheel of the third gear set and the shift element may be arranged on the output shaft in such a way, and in particular the shift wheel of the second gear set and the shift wheel of the third gear set may be connectable and releasable by means of the shift element in such a way, that at least one winding path gear ratio stage is able to be shifted via the shift element. Here, the power flow of the winding path gear ratio stage may wind via at least three gear sets with intermeshing fixed wheels and shift wheels.

If a winding path gear ratio stage is shifted, two of the shift wheels, that is to say in particular the second and the third shift wheel, can be rotationally conjointly connected to one another by the shift element and at the same time the first or the fourth gear set can be activated, that is to say at the same time the first shift wheel can be connected to the output shaft by a first coupling element or the fourth shift wheel can be connected to the output shaft by a second coupling element. The transmission unit may thus specifically comprise six gear ratio stages or group gear ratio stages, which in particular are powershiftable. The transmission unit may thus comprise four gear ratio stages which are shiftable only via one gear set and two gear ratio stages which are shiftable as winding path gear ratio stages. In addition, the second and the third shift wheel may be couplable in such a way that, in particular when the first or the fourth gear set is also fixed to the output shaft by a coupling element, two further gear ratio stages can be implemented as winding path gear ratio stages. The first and the sixth gear ratio stage may be a winding path gear, that is to say be implemented as a winding path gear ratio stage. The size of the steps between the individual gear ratio stages A to F may be constant and/or lie in a range of 1.2 to 2.4, in a range of 1.46 to 2.14, or 1.77.

The transmission unit in particular comprises exactly one shift element, in particular for coupling the shift wheels of the second and third gear set. For this purpose, the shift element may be arranged on the output shaft between the second and the third gear set, and in particular be rotatably mounted on the output shaft. The two shift wheels may be rotationally conjointly and releasably connectable to the shift element, the two coupled shift wheels in particular being able to be rotatably and/or loosely arranged on the output shaft. Here, the two rotatably mounted shift wheels of the second and the third gear set may be couplable via the shift element in such a way that a rotationally conjoint connection is able to be produced depending on a shift state of the shift element between the two shift wheels, with the result that the two shift wheels are rotatable at the same rotational speed. In other words, the two shift wheels may be connected to the shift element in such a way that the first and the second transmission input shaft can be placed in dependence on one another. Specifically, in the case of a winding path gear ratio stage, the shift wheel of the second gear set and the shift wheel of the third gear set are thus coupled to one another in order to implement a common force flow and power flow through the first and the second transmission input shaft as a result.

Advantageously, winding path gear ratio stages are implemented with the discussed transmission unit. Owing to the multiple uses of individual gear sets, components savings in the structural design of the transmission unit are possible. Since the transmission unit in particular is a dual-clutch transmission which comprises two winding path gear ratio stages and is shiftable into different transmission ratios, for example is shiftable into six gear ratio stages, it is thus advantageously possible to implement a maximum number of gear ratio stages with a minimum number of shafts and toothed wheels in the transmission unit. This advantageously makes it possible to achieve a minimal installation space or structural space in the agricultural towing vehicle and an optimally structurally simple design of the transmission unit. Advantageously, the transmission unit also makes it possible to perform powershifts. It is moreover possible, in comparison with transmission units with a comparable number of shafts and toothed wheels, to implement additional transmission ratios, such that the transmission arrangement according to the disclosure achieves improved transmission spread and more gear ratio stages. Moreover, higher driving speeds and low start-up speeds are enabled, as a result of which operation at slow speeds can be implemented with the towing vehicle. The structurally simple way in which the transmission unit is designed makes it possible to save on additional gear stages, as a result of which weight and thus fuel costs are in turn saved. Moreover, the smaller installation space makes it possible for the towing vehicle to become more agile and more compact on account of the shorter distance between wheels and/or for the saved installation space to be able to be used for other functions/assemblies. A further substantial advantage are the shorter gear sets, as a result of which shorter shafts can be used. Shorter shafts in turn ensure less shaft bending and thus a longer bearing and toothing service life.

In an embodiment of the disclosure, the shift element is movable between a first shift position, in which the shift wheel of the second gear set and the shift wheel of the third gear set are coupled, and a second shift position, in which the shift wheel of the second gear set and the shift wheel of the third gear set are released from one another. This advantageously achieves the advantages stated above.

In an example embodiment which is advantageous from a structural perspective, the transmission unit comprises one or more coupling elements, in particular exactly two coupling elements, that is to say for example a first and a second coupling element, the shift wheel being able to be rotationally conjointly and releasably connected to the output shaft by means of one of the coupling elements, in particular each of the shift wheels being able to be rotationally conjointly and releasably connected to the output shaft by means of one of the coupling elements.

The coupling element or elements may be rotationally conjointly and axially displaceably mounted on the output shaft and/or be movable, in particular axially movable, by means of an actuating element, and/or the coupling elements are arranged between in each case two shift wheels, in particular the fixed wheels associated with the shift wheels being arranged on the same transmission input shaft, that is to say the first or the second transmission input shaft.

The coupling elements may be designed in a form known per se as dog clutches or actuating apparatuses, in particular sliding sleeves, and shift assemblies, comprising synchronizing rings, or synchronizers. In any case, the coupling elements are coupling means which are rotationally conjointly and axially displaceably arranged on the output shaft and by means of which the shift wheels are able to be rotationally conjointly connected to the output shaft for the purpose of activating a transmission ratio. The axial displacement of the coupling elements may be effected via the actuating element. To that end, the transmission unit may comprise corresponding actuating elements or in particular each coupling element may comprise a respective actuating element.

In an embodiment of the disclosure, the highest gear ratio stage and the lowest gear ratio stage are implemented as winding path gear ratio stages and/or the highest gear ratio stage utilizes, among other things, the gear set of the previous gear ratio stage and/or the lowest gear ratio stage utilizes, among other things, the gear set of the next highest gear ratio stage. However, in this embodiment variant other assignments of the gear ratio stages with respect to the first and the second clutch are also possible. In particular, it is possible to implement a reverse assignment in a very simple way, e.g. by way of a mirrored arrangement. Advantageously, with the winding path gear ratio stage, in the lowest gear ratio stage the transmission ratio is a product of three transmission ratio stages, as a result of which a larger transmission ratio can be achieved than by just one transmission ratio using one gear set. This enables a lowest gear at slower speeds than without a winding path gear ratio stage. It is also advantageous that additionally, in combination with the winding path gear ratio stage, in the highest gear ratio stage the transmission ratio is likewise a product of three transmission ratio stages and in the highest gear ratio stage higher speeds can be achieved than without a winding path gear ratio stage. This enables a highest gear at higher speeds than without a winding path gear ratio stage.

In an embodiment of the disclosure, the transmission unit comprises six gear ratio stages, for example exactly six gear ratio stages, or for example exactly six powershiftable gear ratio stages, and/or the first and the sixth gear, that is to say the lowest and the highest gear, are implemented as a winding path gear ratio stage. This advantageously achieves optimum transmission stepping, which is ideal for the full scope of operating ranges of agricultural towing vehicles.

In another embodiment, a rear-axle bevel gear drive is connected, in particular rotationally conjointly connected, to the output shaft. Advantageously, on account of the direct connection of the output shaft to the rear-axle bevel gear drive, it is possible to save on expensive connecting elements, for example an articulated shaft, that tend to need maintenance. Moreover, the output shaft can be connected to a toothing of a front-axle drive. To that end, a front-axle drive wheel may be connected to the output shaft, in particular rotationally conjointly connected to the output shaft, or selectively rotationally conjointly connectable thereto and releasable therefrom. Advantageously, the front-axle drive may thus be connected to the rear-axle bevel gear drive by means of the output shaft. Moreover, advantageously the output shaft additionally takes on the function of connecting a front and rear vehicle axle, as a result of which it is possible to save on a further connecting element. Similarly, the output shaft may be connected to a parking lock wheel.

In an embodiment of the disclosure, the pinion of the rear-axle bevel gear drive is in the form of part of the output shaft, in particular is integrated into the output shaft. Advantageously, this makes it possible to achieve a very compact construction, which saves on structural space and transmission length.

An advantageous development of the transmission arrangement provides that a power take-off drive shaft (PTO drive shaft) is arranged in the first and the second transmission input shaft. The power take-off drive shaft may be embodied as a solid shaft. The transmission unit, but in particular also the transmission arrangement, may thus have a shaft leadthrough for a power take-off drive of the agricultural vehicle. To that end, the first and the second transmission input shaft of the transmission unit and/or the clutch drive shaft may be embodied as hollow shafts and may incorporate the power take-off drive shaft for the purpose of driving a power take-off transmission. Expediently, the first and the second clutch may also have a central passage for the power take-off drive shaft. In this way, direct and thus particularly energy-efficient drive-power transmission from the traction motor to a power take-off shaft output of the tractor is possible.

The disclosure also relates to an agricultural towing vehicle, for example a tractor, having a transmission arrangement as disclosed in one or more embodiments herein. The agricultural towing vehicle may moreover comprise a traction motor, in particular an internal combustion engine. In this case, the transmission arrangement may be drivable by the traction motor and be in drive connection with at least one vehicle axle of the towing vehicle and/or may be able to be placed in drive connection with a further drive axle of the towing vehicle. The towing vehicle according to the disclosure has the above-described advantages of the transmission arrangement according to the disclosure.

The transmission arrangement according to the disclosure and the towing vehicle according to the disclosure enable an efficient combination of a power-split transmission device with a downstream transmission unit, which can be in the form of a full powershift transmission. The transmission unit used in the context of the transmission arrangement according to the disclosure advantageously has a considerably narrower construction and manages with little structural space, weight, and rotational inertia, in comparison with the conventional powershift transmissions (PST), as are used in large towing vehicles. As a result, the construction is more cost-effective and provides greater savings on fuel owing to better efficiency. In comparison with various partial powershift transmissions (PPST), as are used in various medium and smaller towing vehicles, in this respect the functionality toward fully powershiftable transmissions is improved. In particular when shifting over from one group to the next, it is advantageous that the towing force is no longer interrupted and work can be continued at full load, both in the field and during transport. This is done with reduced additional weight and structural space requirements, in particular compared to conventional, fully powershiftable transmissions, despite the same degree of performance being attained.

The above and other features will become apparent from the following detailed description and accompanying drawings.

BRIEF DESCRIPTION OF THE DRAWINGS

The transmission arrangement according to the disclosure will be explained in more detail below with reference to the appended drawings. Components of equivalent or comparable function are identified by the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
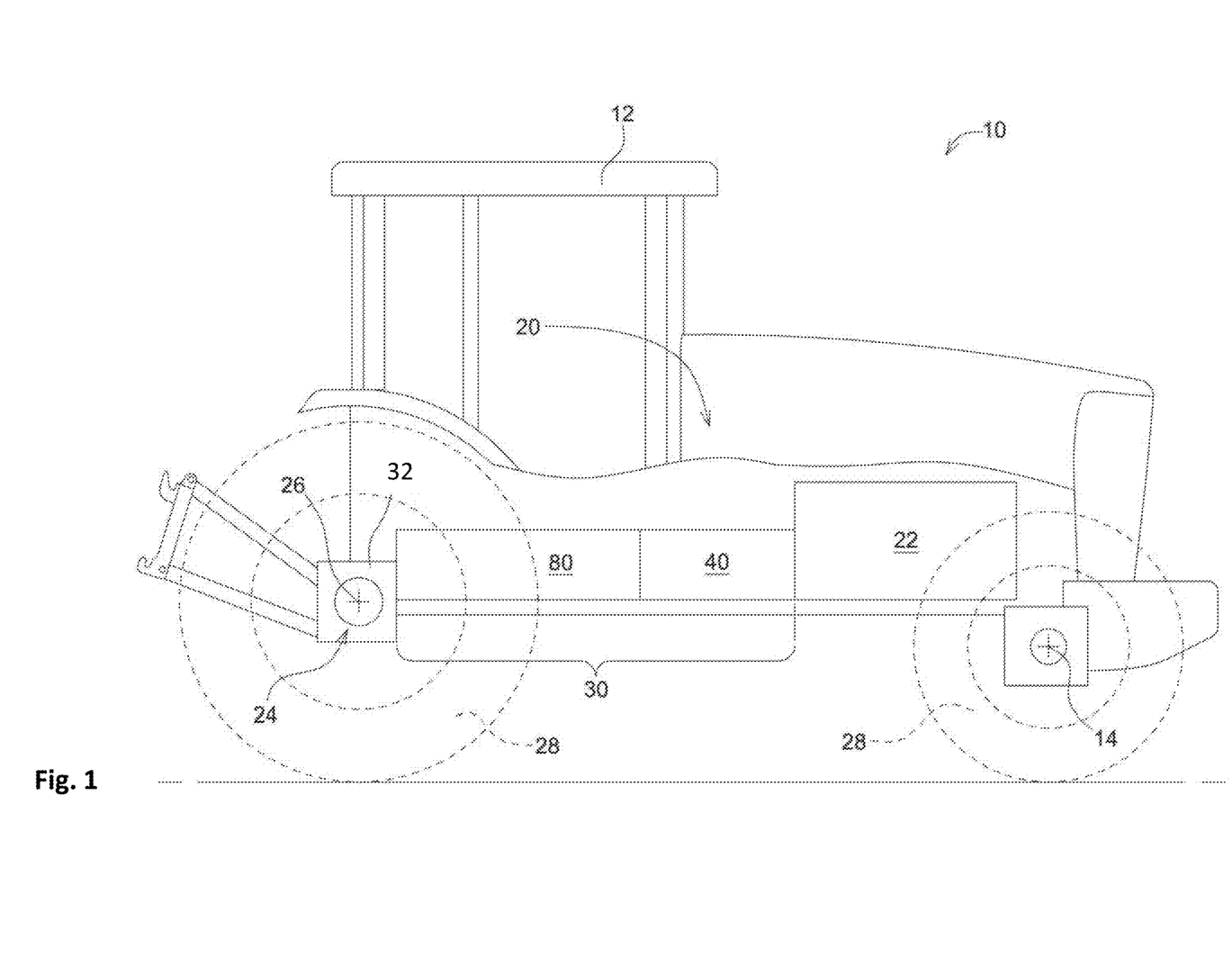
FIG. 1 shows a schematic illustration of an agricultural towing vehicle according to the disclosure.

FIG. 1 shows a schematic illustration of an agricultural towing vehicle 10 according to the disclosure, in particular in the form of a tractor, with a drivetrain 20 according to an embodiment. The basic design of an agricultural towing vehicle 10 is assumed to be known to a person skilled in the art. The towing vehicle 10 also comprises a cab 12, a front vehicle axle 14 and a rear vehicle axle 26. The front vehicle axle 14 and the rear vehicle axle 26 are part of the drivetrain 20, with it being possible for the rear vehicle axle 26 generally to be permanently driven and the front vehicle axle 14 generally to be activatable on demand.

The drivetrain 20 also comprises a traction motor 22, which may be embodied as an internal combustion engine, and a transmission structure which may be composed of various individual transmission components, as described below. The transmission structure described in the present case, in terms of the force flow and torque flow and taking the traction motor 22 as a starting point, may have a transmission arrangement 30 according to the disclosure, a traction drive 24 and a rear-axle transmission 32. The transmission arrangement 30 comprises a transmission device 40 and a transmission unit 80. Here, the transmission device 40 is positioned downstream of the traction motor 22. The transmission device 40 is drive-connected to the traction motor 22 and/or may be drivable by the traction motor 22. The transmission unit 80 is positioned downstream of the transmission device 40. Here, the transmission unit 80 is drive-connected to the transmission device 40 and/or is drivable by the transmission device 40.

The transmission arrangement 30 shown makes it possible to transmit drive power from the traction motor 22 to the output shaft of the transmission unit 80 with different gear ratio stages. The rear vehicle axle 26, which is in drive connection with the output shaft and converts rotation of the front and/or the rear vehicle axle (via ground engagement means connected thereto) into propulsion of the tractor, is therefore driven at a different rotational speed depending on a gear ratio stage selected in the transmission arrangement 30. Consequently, a tractor equipped with the transmission arrangement 30 is movable in different speed ranges depending on the gear ratio stage selected in the transmission arrangement 30.

The towing vehicle 10 may have one or more ground engagement means in the form of wheels 28 which are in engagement with an underlying surface to transmit drive forces and/or by way of which the towing vehicle 10 is supported on the underlying surface. The towing vehicle 10 may moreover have a chassis, it being possible for the chassis in particular to be borne by the wheels suspended on the front and the rear vehicle axle 14, 26.

Figure 2:
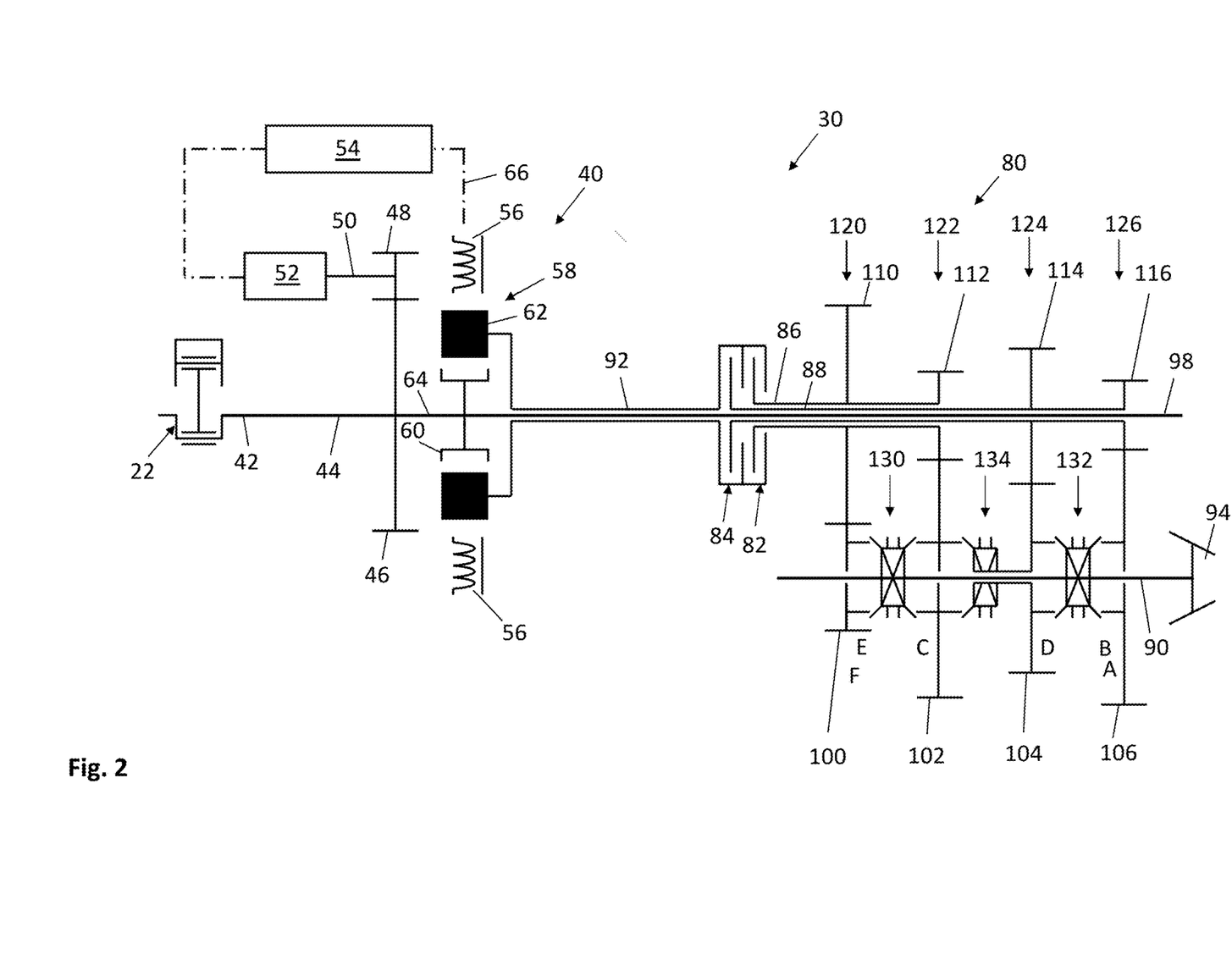
FIG. 2 shows a schematic illustration of a first example embodiment of the transmission arrangement according to the disclosure.

FIG. 2 shows a schematic illustration, in particular a line diagram, of a first example embodiment of the transmission arrangement 30 according to the disclosure. The transmission arrangement 30 shown in FIG. 2 is a detailed schematic illustration of the transmission arrangement 30 shown in FIG. 1. Therefore, only details not shown in FIG. 1 will be discussed below. As already mentioned, the transmission arrangement 30 comprises the transmission device 40 and the transmission unit 80 positioned downstream in the power flow.

The transmission unit 80 contains a first clutch 82 and a second clutch 84, the input side of which, in particular the common input side of which, is drivable.

The transmission unit 80 further comprises a first transmission input shaft 86 and a second input shaft 88 and an output shaft 90, in particular exactly one output shaft 90. The output side of the first clutch 82 is connected to the first input shaft 86, in particular the first clutch 82 is rotationally conjointly connected to the first transmission input shaft 86. The output side of the second clutch 84 is connected to the second transmission input shaft 88, in particular the second clutch 84 is rotationally conjointly connected to the second transmission input shaft 88. The transmission unit 80 comprises a clutch drive shaft 92 as the input side. The first and the second clutch 82, 84 are movable and/or shiftable between an open state, in which the clutch drive shaft 92 is released in terms of drive from the first and/or the second transmission input shaft 86, 88, and a closed state, in which the clutch drive shaft 92 is in drive connection with the first and/or the second transmission input shaft 86, 88.

Furthermore, a rear-axle bevel gear drive 94 is connected to the output shaft 90. In this case, the pinion of the rear-axle bevel gear drive 94 may be in the form of part of the output shaft 90, in particular may be integrated into the output shaft 90.

Moreover, the first and/or the second transmission input shaft 86, 88 are in the form of hollow shafts and the second transmission input shaft 88 is arranged in the first transmission input shaft 86. Furthermore, the first and/or the second transmission input shaft 86, 88 incorporate a power take-off drive shaft 98 for driving a power take-off transmission.

Four shift wheels 100, 102, 104, 106 are rotatably mounted on the output shaft 90. In total, four fixed wheels 110, 112, 114, 116 are rotationally conjointly arranged on the first and the second transmission input shaft 86, 88, in particular are rotationally conjointly connected to the first and the second transmission input shaft 86, 88. In this case, the first and the second transmission input shaft 86, 88 are each assigned two fixed wheels. These each mesh with one of the shift wheels 100, 102, 104, 106 assigned to the output shaft 90. The transmission unit 80 has multiple gear sets, in particular four gear sets 120, 122, 124, 126, for establishing gear ratio stages B, C, D, E. To that end, at least one first gear set 120 and one second gear set 122 each have the fixed wheel 110, 112 on the first input shaft 86 and each have the shift wheel 100, 102 on the output shaft 90. Moreover, at least one third gear set 124 and one fourth gear set 126 each have the fixed wheel 114, 116 on the second input shaft 88 and each have the shift wheel 104, 106 on the output shaft 90. Specifically, the first gear set 120 comprises a first fixed wheel 110, which meshes with a first shift wheel 100 on the output shaft 90. The second gear set 122 comprises a second fixed wheel 112, which is in engagement with a second shift wheel 102. The third gear set 124 comprises a third fixed wheel 114, which meshes with a third shift wheel 104. The fourth gear set 126 comprises a fourth fixed wheel 116, which is in engagement with a fourth shift wheel 106.

The dimensioning of the gear sets 120, 122, 124, 126 is not necessarily to scale in relation to one another. Rather, the actual radii of the fixed wheels 110, 112, 114, 116 and of the shift wheels 100, 102, 104, 106 may be dimensioned differently and in a manner that is suitable for the transmission unit 80 and the transmission arrangement 30.

The transmission unit 80 also comprises exactly two coupling elements 130, 132, that is to say a first coupling element 130 and a second coupling element 132. The first coupling element 130 is arranged between the first and the second gear set 120, 122 and the second coupling element 132 is arranged between the third and the fourth gear set 124, 126 on the output shaft 90. The shift wheels 100, 102, 104, 106 are rotationally conjointly and releasably connectable to the output shaft 90 by means of the first or the second coupling element 130, 132. Specifically, the first shift wheel 100 or the second shift wheel 102 is thus rotationally conjointly and releasably connectable to the output shaft 90 by means of the first coupling element 130. Moreover, the third shift wheel 104 or the fourth shift wheel 106 is rotationally conjointly and releasably connectable to the output shaft 90 by means of the second coupling element 132. A respective coupling element 130, 132 is thus arranged between in each case two shift wheels 100, 102, 104, 106. The first and the second coupling element 130, 132 are rotationally conjointly and axially displaceably mounted on the output shaft 90. The first and the second coupling element 130, 132 are in the form of shift assemblies, which comprise actuating apparatuses, in particular sliding sleeves, and synchronizing rings. As a result, the rotatably mounted shift wheels 100, 102, 104, 106 are shiftable via the coupling elements 130, 132, and therefore a respective fixed rotational speed ratio is able to be established between the output shaft 90 and the respective first and/or second transmission input shaft 86, 88 depending on a shift state of the coupling elements 130, 132.

The transmission unit 80 moreover comprises a shift element 134 for coupling two shift wheels 102, 104. Specifically, the second and the third shift wheel 102, 104 are able to be coupled to the shift element 134. The second and the third shift wheel 102, 104 are rotationally conjointly and releasably connectable to the shift element 134. The second and the third shift wheel 102, 104 are able to be coupled, in particular selectively coupled, to the shift element 134 in such a way that at least one winding path gear ratio stage A, F is able to be formed via the second and the third gear set 122, 124, i.e. in particular the first and the second transmission input shaft 86, 88 are thus able to be coupled to one another. In other words, the shift element 134 may in particular be movable between a first shift position, in which the second shift wheel 104 and the third shift wheel 102 are coupled, and a second shift position, in which the second shift wheel 104 and the third shift wheel 102 are released from one another. The shift element 134 is in the form of a synchronizer acting on one side. The shift element 134 is arranged between the first and the second coupling element 130, 132 along the output shaft 90.

Depending on the shift state of the first and the second clutch 82, 84 and on the shift state of the first and the second coupling element 130, 132 and of the shift element 134, the transmission unit 80 can be shifted with each of the clutches 82, 84 in two gear ratio stages, i.e. a total of four gear ratio stages B, C, D, E, and in each case an additional gear ratio stage as a winding path gear ratio stage A, F, i.e. a total of two winding path gear ratio stages A, F, and thus shifted in a total of six gear ratio stages or group gear ratio stages. In this case, the transmission unit 80 can be shifted under load in that while one clutch, for example the first clutch 82, is being opened, the other clutch, for example the second clutch 84, is closed, with the result that a drive connection existing between the first or the second transmission input shaft 86, 88 and the clutch drive shaft 92 is able to be replaced by a drive connection to be established via the respectively other transmission input shaft 86, 88, without interrupting a drive connection between the first or the second transmission input shaft 86, 88 and the output shaft 90. To preselect a desired gear ratio stage, the shift wheel in question, that is to say in particular the first to the fourth shift wheel 100, 102, 104, 106, is rotationally conjointly connected to the output shaft 90 by the respectively assigned first or second coupling element 130, 132, with the result that the gear ratio stages B, C, D, E are implemented. If a gear ratio stage A, F as a winding path gear ratio stage is shifted, the second and the third shift wheel 102, 104 are rotationally conjointly connected to one another by the shift element 134 and at the same time the gear ratio stage E or B is activated, that is to say at the same time the first shift wheel 100 is connected to the output shaft 90 by the first coupling element 130 (gear ratio stage E) or the fourth shift wheel 106 is connected to the output shaft 90 by the second coupling element 132 (gear ratio stage B). Consequently, each winding path gear ratio stage runs over three gear sets. The transmission unit 80 thus comprises six gear ratio stages, which in particular are powershiftable. Specifically, the first and the sixth gear ratio stages A, F are a winding path gear, i.e. implemented as winding path gear ratio stages.

The transmission arrangement 30 comprises essentially two functional groups, which are in drive connection with one another via shafts. The transmission device 40 is arranged on the input side of the transmission arrangement 30. The transmission device 40 may be in drive connection with the traction motor 22 and be drivable by the traction motor 22. The transmission device 40 is in drive connection with the transmission unit 80 via the clutch drive shaft 92, which is in the form of a hollow shaft. The transmission unit 80 comprises the output shaft 90, which at the same time is the drive output shaft of the transmission arrangement 30, on the output side.

A motor drive output shaft 42 on the internal combustion engine 22 is in particular rotationally conjointly extended along the power flow and forms in this extension an input shaft 44 for the transmission arrangement 30. The input shaft 44 may supply the power take-off drive shaft 98 with drive power and is, to this end, in the form of a continuous shaft in an axial direction.

A drive wheel 46 is rotationally conjointly arranged on the input shaft 44 and meshes with a further drive wheel 48. The drive wheel 48 is rotationally conjointly arranged on a drive shaft 50 which is in an in particular releasable drive connection with an electric machine 52. This makes it possible for the internal combustion engine 22 and the electric machine to be in a constant rotational speed ratio. As long as the electric machine 52 is in drive connection with the input shaft 44, a proportion of mechanical energy or power of the internal combustion engine is converted into electrical energy or power. The remaining mechanical proportion in the input shaft 44 is transmitted by the latter. Electrical power generated by the electric machine 52 can be transmitted controlled by a transmission control unit 54 in a variable manner to a stator 56 of a magnetic-electrical epicyclic transmission stage 58. The transmission control unit 54 may be combined with a power electronics system and/or a battery unit or may comprise such a power electronics system and/or battery unit. Depending on the power requirement at the stator 56, the electrical power of the electric machine 52 may first be stored temporarily or be transmitted directly to the stator 56.

The magnetic-electrical epicyclic transmission stage 58 comprises the external stator 56, an internal rotor 60 and an interposed rotatable magnetic modulation ring 62. The internal rotor 60 is rotationally conjointly connected to the input shaft 44. The modulation ring 62 is rotationally conjointly connected or at least connectable in terms of drive to the clutch drive shaft 92 in the form of a hollow shaft. The clutch drive shaft 92 surrounds the continuous input shaft 44.

The design of the transmission device 40 is of power-split form with a mechanical transmission branch 64 in the region of the continuous input shaft 44 and with an electrical or variable transmission branch 66 contained in the magnetic-electrical epicyclic transmission stage 58. Both the rotating rotor 60 and the electrically actuated stator 56 influence the rotation of the modulation ring 62. This makes it possible to variably set an outgoing rotational speed and an outgoing torque at the modulation ring 62. This is utilized during the gearshift operations of the transmission unit 80 to allow the switchover operation to proceed more quickly and to improve the shift comfort. Proceeding from the gearshift operation in the transmission unit 80, the rotational speed or the drive power at the clutch drive shaft 92 is adapted in parallel by virtue of the excitation frequency of the winding(s) on the external stator 56 being changed by the transmission control unit 54. During this change, essentially no moment of inertia is produced, and therefore a change in the moment of inertia of the transmission arrangement is kept very small and changes in speed during the gearshift operations are no longer perceptible. The inertia-free change in rotational speed at the modulation ring contributes to achieving harmonious jerk-free operation during the gearshift operations.

The variable setting of the rotatable modulation ring 62 by the transmission control unit 54 also enables a reversal of the direction of rotation of the modulation ring 62. In other words, the stator 56 is able to be actuated to obtain a direction of rotation of the output shaft 90 in the opposite direction to the direction of rotation of the input shaft 44, and therefore forward and backward operation of the transmission arrangement 30 is possible by way of the epicyclic transmission stage 58.

Figure 3:
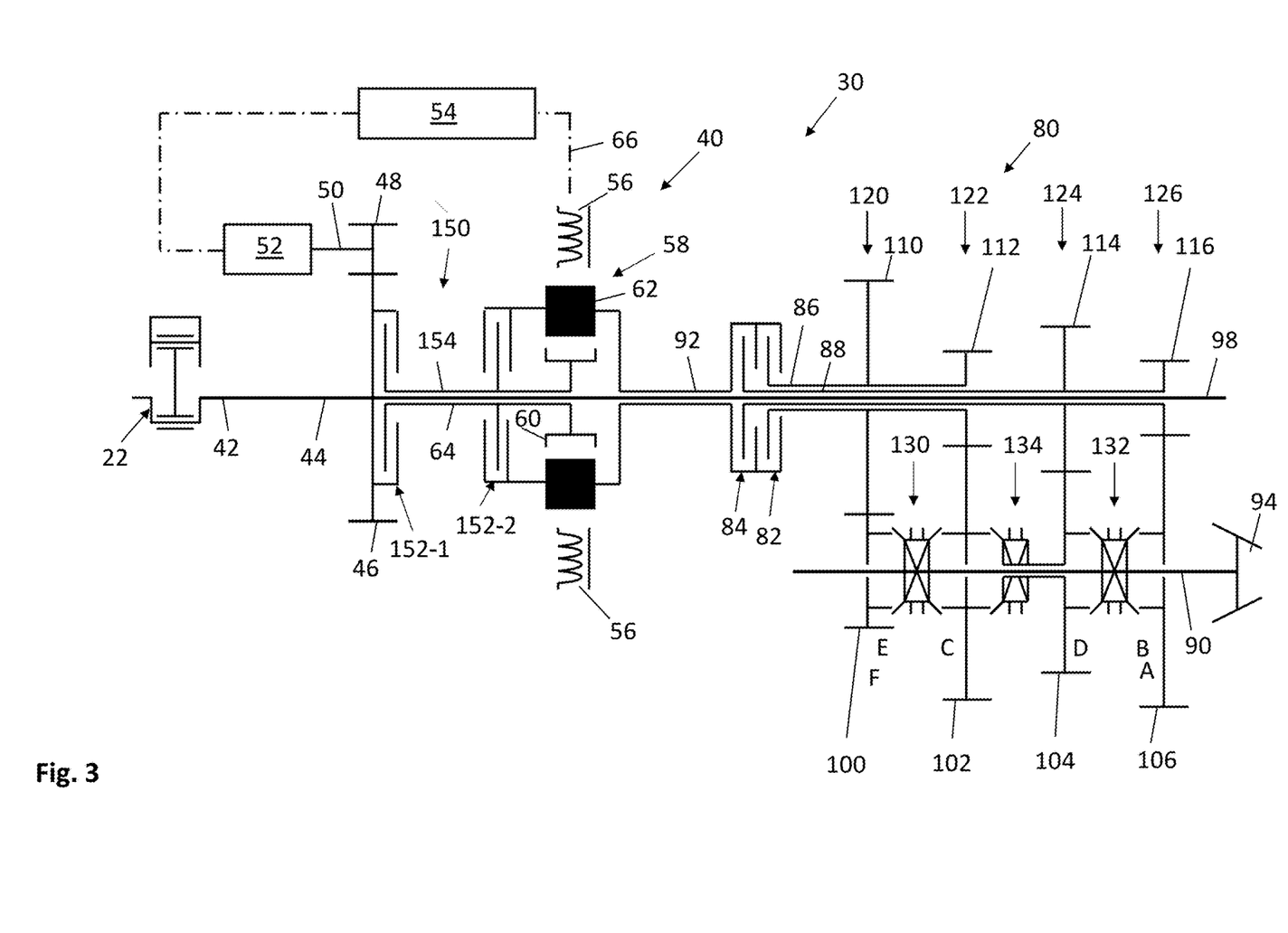
FIG. 3 shows a schematic illustration of a further example embodiment of the transmission arrangement according to the disclosure.

FIG. 3 shows a schematic illustration, in particular a line diagram, of a further example embodiment of the transmission arrangement 30 according to the disclosure. Here, the transmission unit 80 corresponds substantially to the transmission unit 80 shown in FIG. 2, and therefore only details and/or differences in the transmission device 40 are discussed below. In FIG. 3, a start-up module 150 for electric start-up is arranged between the electric machine 52 and the magnetic-electrical epicyclic transmission stage 58 in the power flow. For this purpose, the start-up module 150 comprises a first clutch unit 152-1 and a second clutch unit 152-2. The first clutch unit 152-1 is rotationally conjointly connected to the input shaft 44 on the drive side and is rotationally conjointly connected to the rotor 60 of the epicyclic transmission stage 58 by way of a rotor drive shaft 154, in the form of a hollow shaft, on the output side. Along the power flow, the second clutch unit 152-2 is rotationally conjointly connected to the rotor drive shaft 154 on one side and is rotationally conjointly connected to the modulation ring 62 on the other side.

With the first clutch unit 152-1, it is selectively possible to implement coupling and decoupling of the in particular mechanical drive connection between the input shaft 44 and the epicyclic transmission stage 58. In a closed state of the first clutch unit 152-1, the input shaft 44 and the rotor 60 are in drive connection with one another via the rotor drive shaft 154, and therefore the mechanical transmission branch 64 is effective for the modulation ring 62.

In the open state of the first clutch unit 152-1 illustrated in FIG. 3, the modulation ring 62 is decoupled from the mechanical transmission branch 64, enabling a purely electric start-up via the variable transmission branch 66. Here, electrical energy is transmitted to the stator 56 by the transmission control unit 54 and/or via a battery unit. In particular, a constant rotational speed ratio between the rotor 60 and the modulation ring 62 is also produced here. This is achieved by a corresponding actuation of the second clutch unit 152-2. Electric start-up is particularly advantageous in the case of high trailer loads, which usually require a significant reduction ratio at low driving speeds in order to start up.

Figure 4:
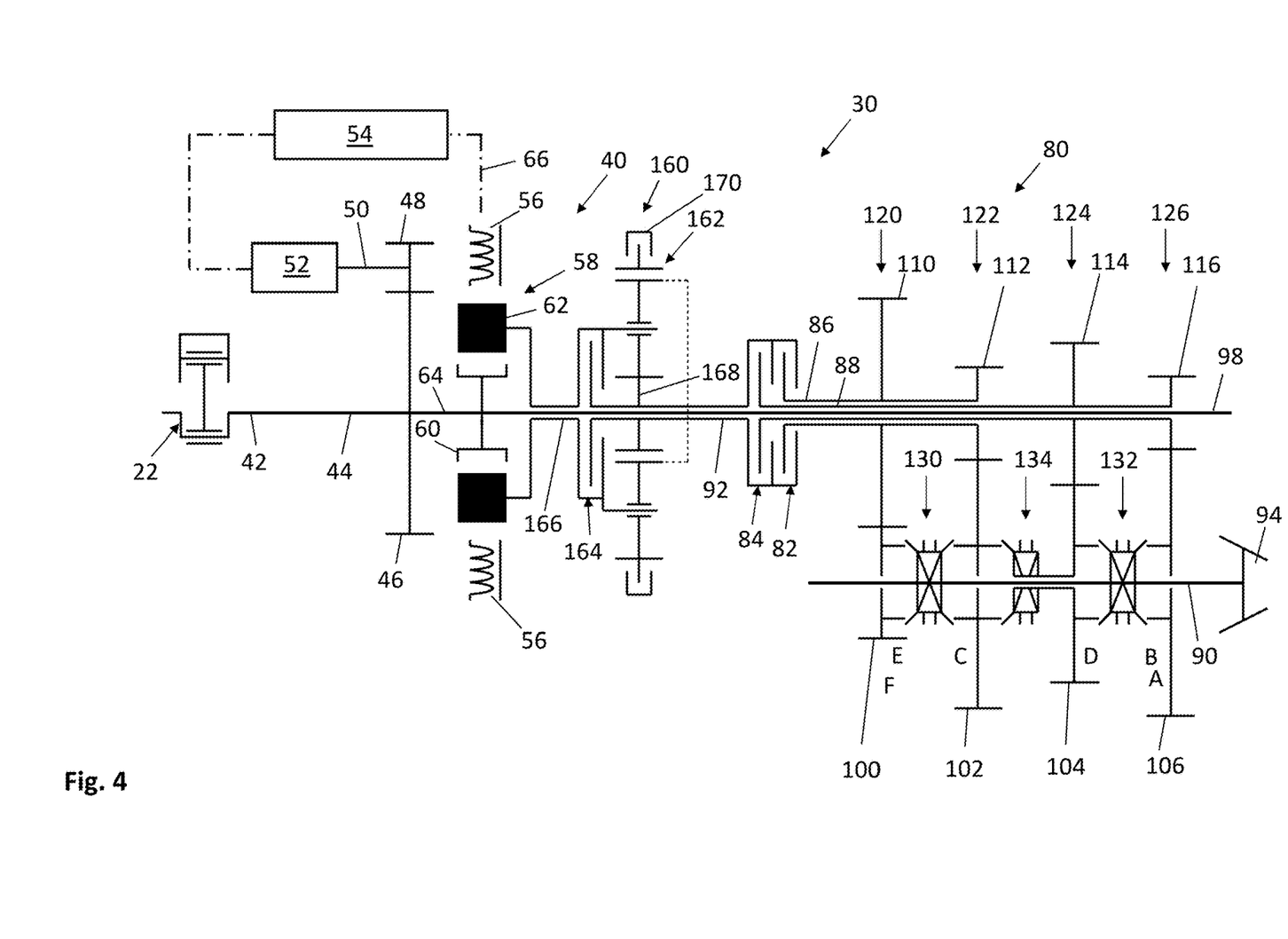
FIG. 4 shows a schematic illustration of a further example embodiment of the transmission arrangement according to the disclosure.

FIG. 4 shows a schematic illustration, in particular a line diagram, of a further example embodiment of the transmission arrangement 30 according to the disclosure. It differs from the transmission arrangement 30 according to FIG. 2 essentially in that a transmission stage 160 for reversing a direction of rotation is arranged between the epicyclic transmission stage 58 and the transmission unit 80 in the power flow. The transmission stage 160 comprises a planetary transmission 162 and a clutch device 164 positioned upstream of the planetary transmission 162. The clutch device 164 is rotationally conjointly connected to the modulation ring 62 by way of a connecting shaft 166, in the form of a hollow shaft, on the drive side. On the output side, the clutch device 164 is rotationally conjointly connected to the clutch drive shaft 92. A sun wheel 168 of the planetary transmission 162 is also rotationally conjointly connected to the clutch drive shaft 92. Actuation of the clutch device 164 between an open and a closed state and/or actuation of a brake apparatus 170 on the planetary transmission 162 makes it possible to orient the direction of rotation of the clutch drive shaft 92 oppositely in comparison to the direction of rotation of the modulation ring 62 and thus to provide forward and backward operation of the transmission arrangement 30.

Figure 5:
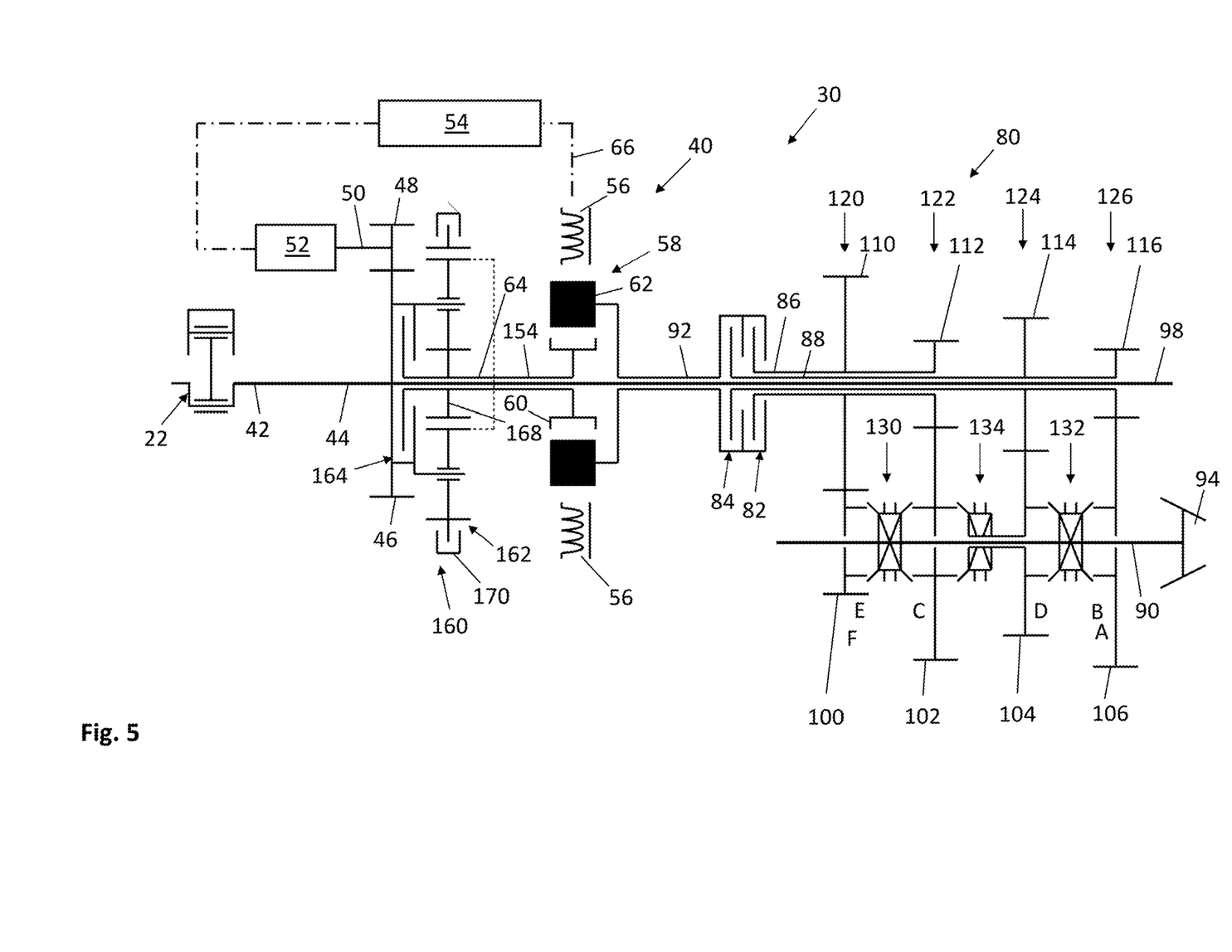
FIG. 5 shows a schematic illustration of a further example embodiment of the transmission arrangement according to the disclosure.

FIG. 5 shows a schematic illustration, in particular a line diagram, of a further example embodiment of the transmission arrangement 30 according to the disclosure. It differs from the transmission arrangement 30 according to FIG. 3 essentially in that the functionality of the transmission stage 160 for reversing a direction of rotation, already disclosed in FIG. 4, is integrated in the transmission device 40. However, the transmission stage 160 in FIG. 5 is arranged between the electric machine 52 and the epicyclic transmission stage 58 in the power flow. In this case, the clutch device 164 is rotationally conjointly connected to the input shaft 44 on the drive side and is rotationally conjointly connected to the rotor 60 of the epicyclic transmission stage 58 by way of the rotor drive shaft 154 on the output side. The sun wheel 168 of the planetary transmission 162 is rotationally conjointly connected to the rotor drive shaft 154. Actuation of the clutch device 164 between an open and a closed state and/or actuation of the brake apparatus 170 on the planetary transmission 162 makes it possible to orient the direction of rotation of the rotor 60 oppositely in comparison to the direction of rotation of the input shaft 44. A change in direction of rotation of the magnetic rotor 60 can generate or assist a change in direction of rotation of the modulation ring 62 and thus of the clutch drive shaft 92. This makes it possible to provide forward and backward operation of the transmission arrangement 30.

In another embodiment that is not illustrated here, the transmission device 40 according to FIG. 5 can be supplemented with the second clutch unit 152-2 according to FIG. 3. In FIG. 5, this second clutch unit 152-2 then basically has the same relative arrangement with respect to the rotor drive shaft 154 and the modulation ring 62 as in the embodiment according to FIG. 3. In FIG. 5, this second clutch unit 152-2 then forms, together with the clutch device 164, the functionality of the start-up module 150 according to FIG. 3. In this way, the clutch device 164 according to FIG. 5 obtains a dual function and can contribute in a component-saving manner to the implementation of the functionality of a start-up module 150 in the transmission device 40 according to FIG. 5.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. Agricultural towing vehicle, comprising:
A transmission arrangement for a drivetrain of an an input shaft;
an output shaft;
a transmission device including a mechanical transmission branch and a variable transmission branch with a magnetic-electrical epicyclic transmission stage having an internal rotor, an external stator, and an interposed rotatable magnetic modulation ring being rotationally conjointly connectable to a clutch drive shaft;
a transmission unit which is arranged downstream in a power flow and which includes a first clutch and a second clutch connected to the clutch drive shaft and at least four gear sets for establishing at least four gear ratio stages; and
an electric machine coupled to the input shaft and configured to transmit electrical power to the external stator, which is configured to rotate the modulation ring.

2. The transmission arrangement of claim 1, further comprising a transmission control unit configured to transmit electrical power to the external stator for actuation.

3. The transmission arrangement of claim 1, wherein the transmission unit has a reverse gear.

4. The transmission arrangement of claim 1, further comprising one of a transmission stage for reversing a direction of rotation arranged between the electric machine and the magnetic-electrical epicyclic transmission stage and a transmission stage for reversing a direction of rotation arranged between the magnetic-electrical epicyclic transmission stage and the transmission unit.

5. The transmission arrangement of claim 4, wherein the transmission stage for reversing a direction of rotation includes a planetary transmission.

6. The transmission arrangement of claim 5, wherein the transmission stage for reversing a direction of rotation comprises a clutch device positioned upstream of the planetary transmission.

7. The transmission arrangement of claim 1, further comprising a start-up module for electric start-up is arranged between the electric machine and the magnetic-electrical epicyclic transmission stage in the power flow, the start-up module being configured for the selective coupling and decoupling of a drive connection between the electric machine and the magnetic-electrical epicyclic transmission stage.

8. The transmission arrangement of claim 7, wherein the start-up module includes one or more of a clutch unit which is drive-connected to one or more of the input shaft and the electric machine on a drive side and is rotationally conjointly connected to the rotor of the magnetic-electrical epicyclic transmission stage by way of a rotor drive shaft on the output side, and the clutch unit which along the power flow is rotationally conjointly connected on one side to the rotor of the magnetic-electrical epicyclic transmission stage by way of a rotor drive shaft and is rotationally conjointly connected on the other side to the modulation ring.

9. The transmission arrangement of claim 6, wherein the clutch device operates as a start-up module for electric start-up and is arranged between the electric machine and the magnetic-electrical epicyclic transmission stage in the power flow, the clutch device being configured for the selective coupling and decoupling of a drive connection between the electric machine and the magnetic-electrical epicyclic transmission stage.

10. The transmission arrangement of claim 1, wherein the first clutch is rotationally conjointly connected to a first transmission input shaft of the transmission unit and the second clutch is rotationally conjointly connected to a second transmission input shaft of the transmission unit.

11. The transmission arrangement of claim 10, further comprising:
a first gear set having a first fixed wheel on the first transmission input shaft and a first shift wheel on the output shaft;
a second gear set having a second fixed wheel on the first transmission input shaft and a second shift wheel on the output shaft;
a third gear set having a third fixed wheel on the second transmission input shaft and a third shift wheel on the output shaft; and
a fourth gear set having a fourth fixed wheel on the second transmission input shaft and a fourth shift wheel on the output shaft.

12. The transmission arrangement of claim 11, wherein the transmission unit includes a first coupling element arranged between the first and second gear sets, the first coupling element selectively coupling the first shift wheel to the output shaft and the second shift wheel to the output shaft.

13. The transmission arrangement of claim 12, wherein the transmission unit includes a second coupling element arranged between the third and fourth gear sets, the second coupling element selectively coupling the third shift wheel to the output shaft and the fourth shift wheel to the output shaft.

14. The transmission arrangement of claim 13, wherein the transmission unit includes a shift element arranged between the second and third gear sets, the shift element selectively coupling the second shift wheel to the third shift wheel.

15. The transmission arrangement of claim 14, wherein the at least four gear ratio stages includes six gear ratio stages and the first and the sixth gear are implemented as a winding path gear ratio stage.

16. An agricultural towing vehicle comprising the transmission arrangement of claim 1.

* * * * *